(12) United States Patent
Mays

(10) Patent No.: US 10,767,985 B1
(45) Date of Patent: Sep. 8, 2020

(54) CONDUIT LASER ALIGNMENT ASSEMBLY

(71) Applicant: Harold Mays, Huntington, WV (US)

(72) Inventor: Harold Mays, Huntington, WV (US)

( * ) Notice: Subject to any disclaimer, the term of this patent is extended or adjusted under 35 U.S.C. 154(b) by 0 days.

(21) Appl. No.: 16/675,308

(22) Filed: Nov. 6, 2019

(51) Int. Cl.
  *G01B 11/26* (2006.01)
  *G01B 11/27* (2006.01)
  *G01C 15/10* (2006.01)
(52) U.S. Cl.
  CPC ............ *G01B 11/27* (2013.01); *G01C 15/105* (2013.01)
(58) Field of Classification Search
  CPC ....... G01B 11/26; G01B 11/272; G01B 11/27; G01C 15/004; G01C 15/002
  USPC .......................................................... 356/138
  See application file for complete search history.

(56) References Cited

U.S. PATENT DOCUMENTS

| | | | |
|---|---|---|---|
| 4,566,202 A | 1/1986 | Hamar | |
| 5,568,265 A | 10/1996 | Matthews | |
| 6,266,143 B1 | 7/2001 | Peterson | |
| 6,643,019 B1 | 11/2003 | Jenneret | |
| 7,155,834 B2 | 1/2007 | Palumbo | |
| D674,525 S | 1/2013 | Sharrah | |
| 9,614,344 B2* | 4/2017 | Reeves-Hall | ....... H01S 3/08009 |
| 2018/0217061 A1* | 8/2018 | Ng | ..................... G01N 21/6486 |

* cited by examiner

*Primary Examiner* — Md M Rahman

(57) ABSTRACT

A conduit laser alignment assembly includes a plurality of tubes that each has a unique diameter with respect to each other. A respective one of the tubes is positionable on an exposed end of an existing conduit in a building that has a diameter corresponding to the diameter of the respective tube. A laser emitter is removably coupled to the respective tube when the respective tube is positioned on the exposed end of the conduit. In this way the laser emitter can emit a beam of light that extends along a longitudinal axis of the existing conduit thereby facilitating the route of a new conduit to be displayed. An adapter disk is provided for coupling the laser emitter to a tube that has a greater diameter than the laser emitter.

7 Claims, 6 Drawing Sheets

CONDUIT LASER ALIGNMENT ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention

The disclosure relates to alignment devices and more particularly pertains to a new alignment device for visually displaying the route of proposed conduit.

(2) Description of Related Art Including Information Disclosed Under 37 CFR 1.97 and 1.98

The prior art relates to alignment devices. The prior art discloses a variety of laser alignment devices for visually displaying an alignment axis. The prior art discloses a stand that is positioned adjacent to a pipe for supporting a laser emitter that shines a beam of light through the pipe for leveling the pipe. The prior art additionally discloses a laser emitter that is insertable in a pipe cap that is positionable over an end of a pipe. The pipe cap includes a nipple that insertably receives the laser emitter. The prior art further discloses a fitting that threadably engages an interior surface of a pipe. The fitting insertably receives a laser emitter.

BRIEF SUMMARY OF THE INVENTION

An embodiment of the disclosure meets the needs presented above by generally comprising a plurality of tubes that each has a unique diameter with respect to each other. A respective one of the tubes is positionable on an exposed end of an existing conduit in a building that has a diameter corresponding to the diameter of the respective tube. A laser emitter is removably coupled to the respective tube when the respective tube is positioned on the exposed end of the conduit. In this way the laser emitter can emit a beam of light that extends along a longitudinal axis of the existing conduit thereby facilitating the route of a new conduit to be displayed. An adapter disk is provided for coupling the laser emitter to a tube that has a greater diameter than the laser emitter.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
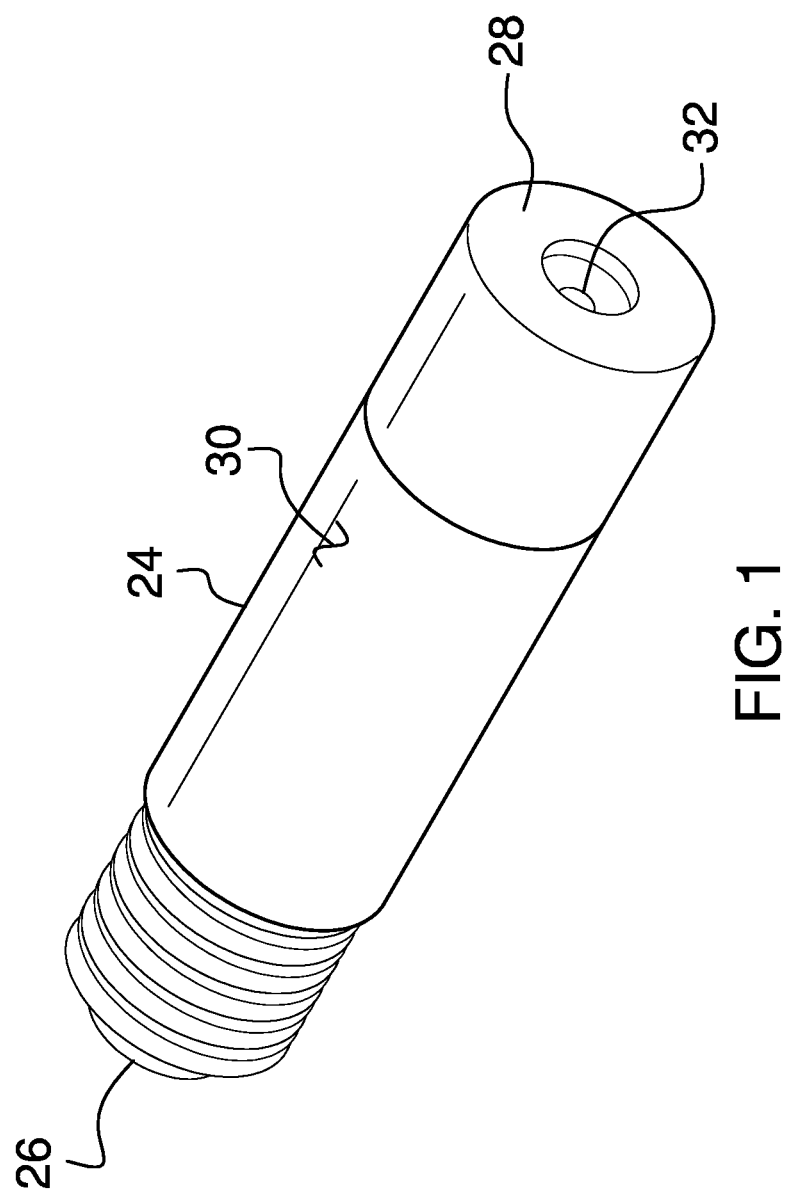
FIG. 1 is a perspective view of a laser emitter of a conduit laser alignment assembly according to an embodiment of the disclosure.
Figure 2:
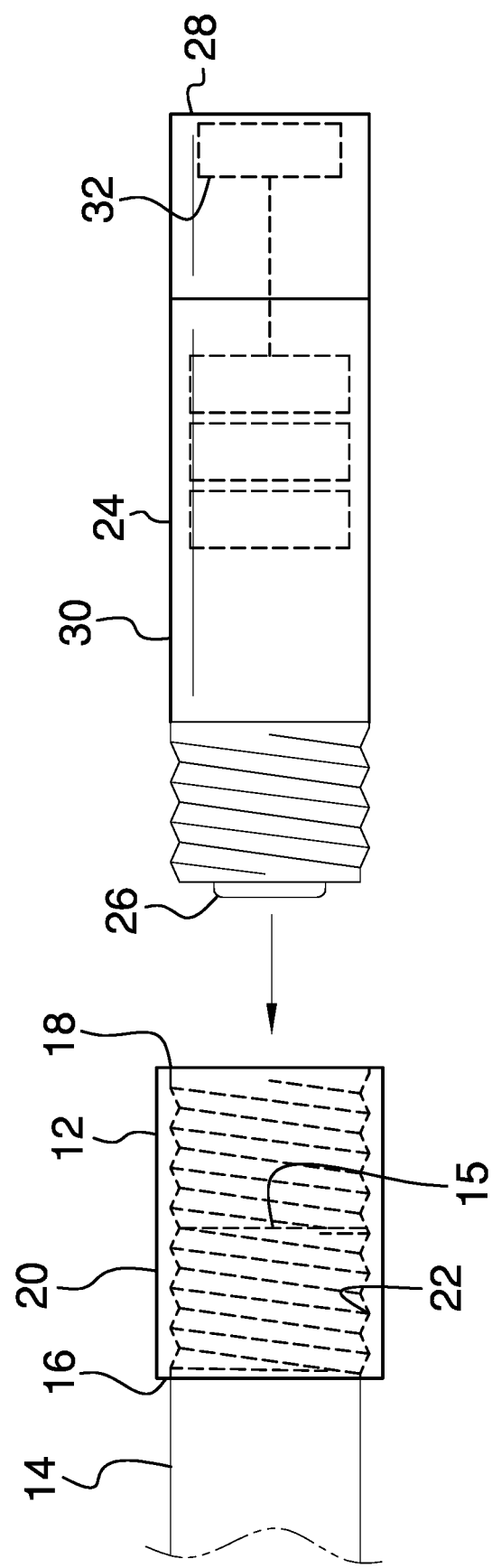
FIG. 2 is an exploded phantom view of an embodiment of the disclosure.
Figure 3:
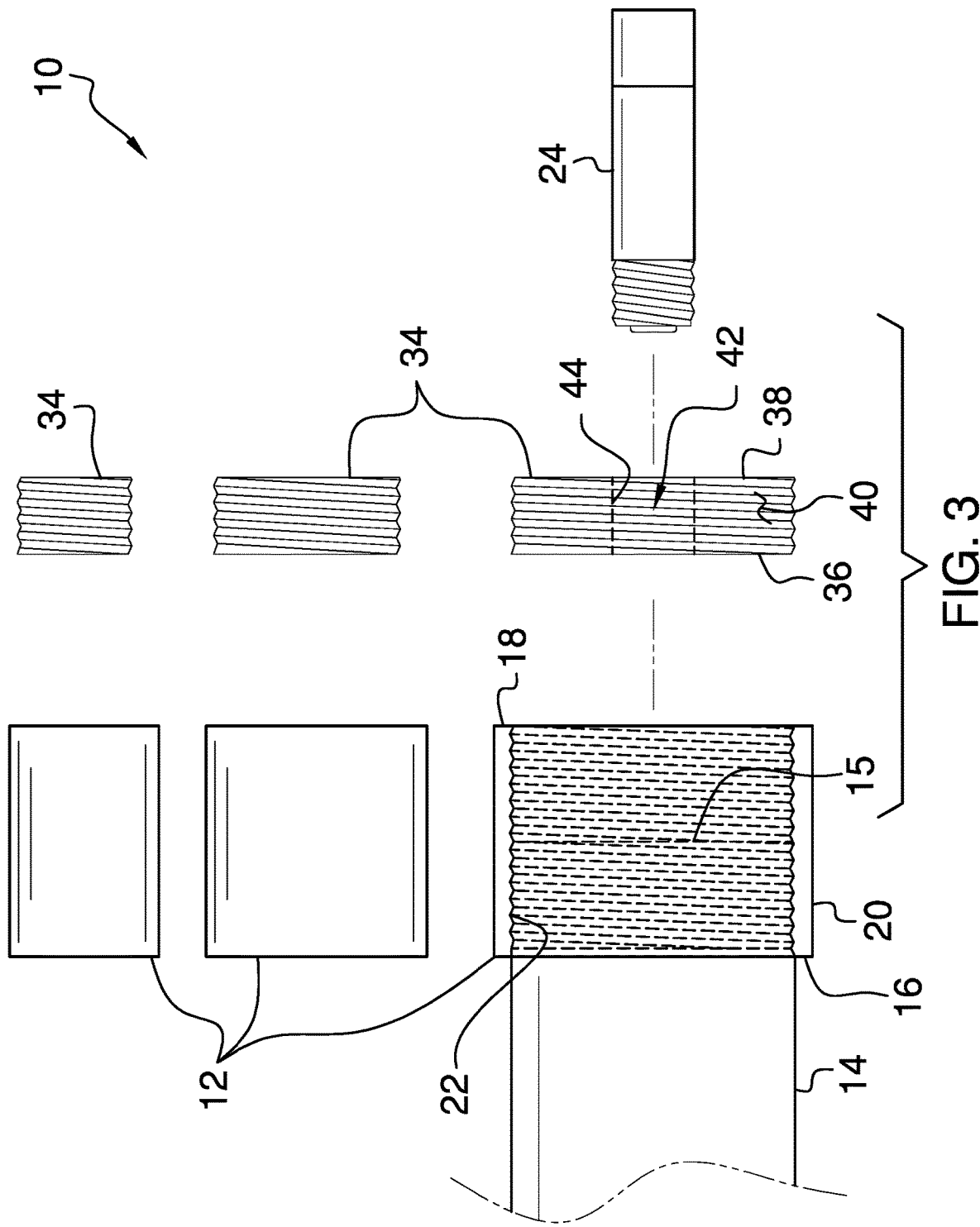
FIG. 3 is an exploded phantom view of an embodiment of the disclosure showing an adapter disk being inserted into a tube.
Figure 4:
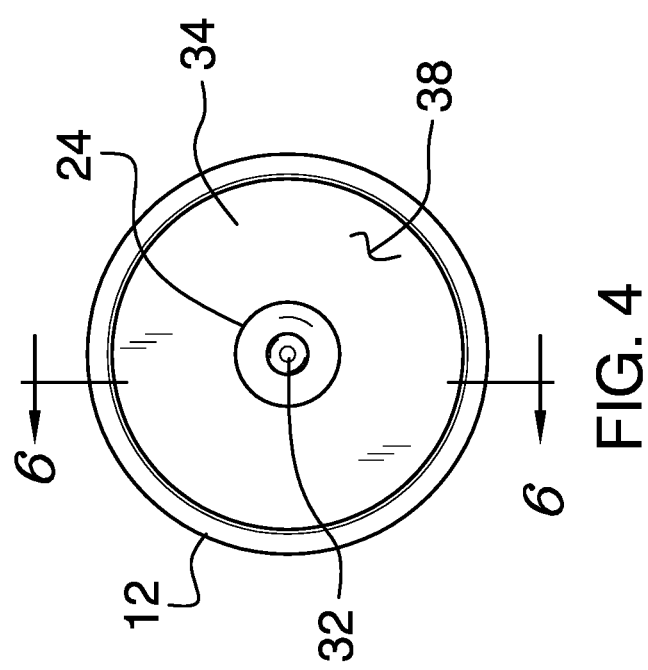
FIG. 4 is a front view of an embodiment of the disclosure.
Figure 5:
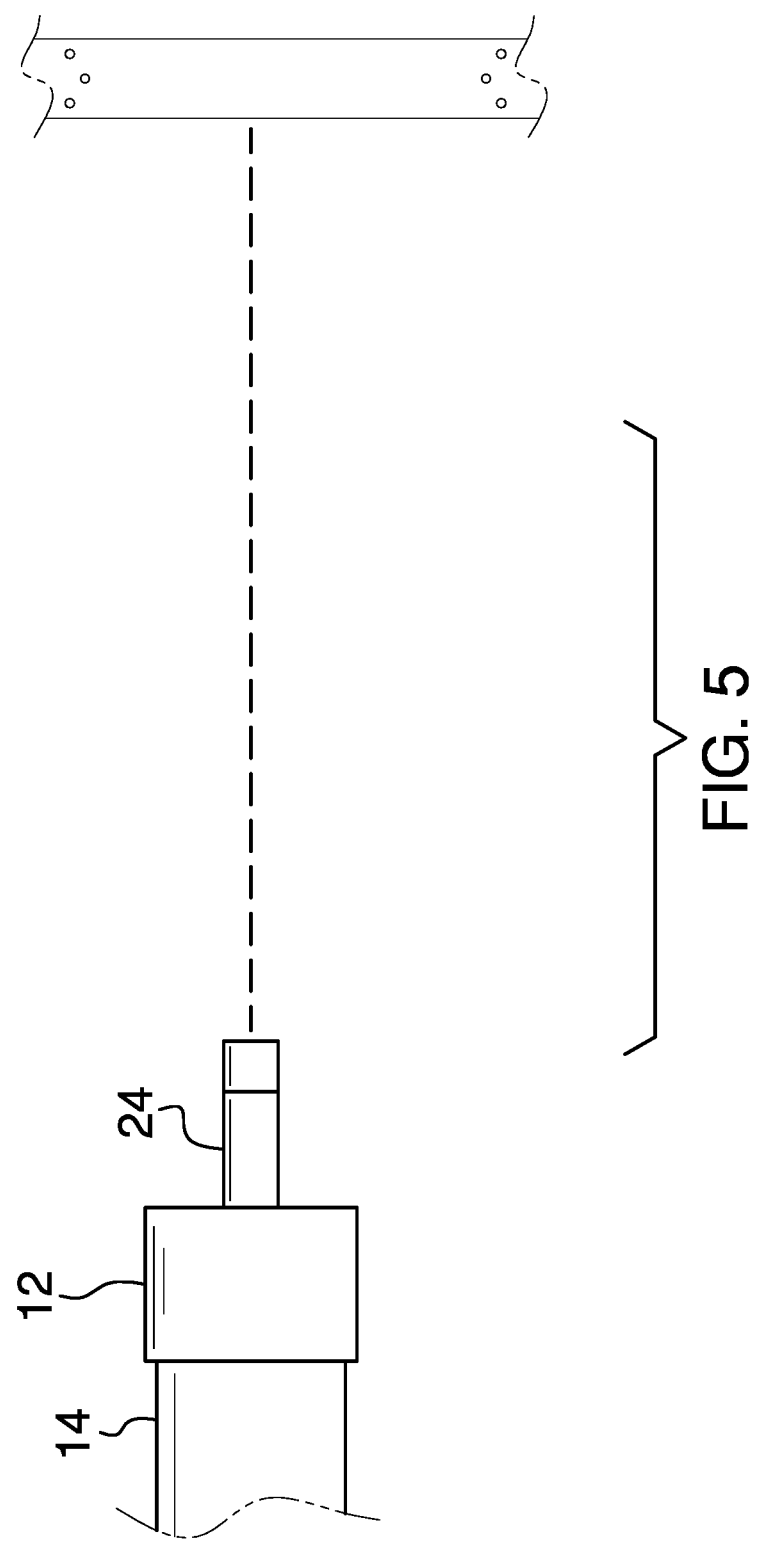
FIG. 5 is a perspective in-use view of an embodiment of the disclosure.
Figure 6:
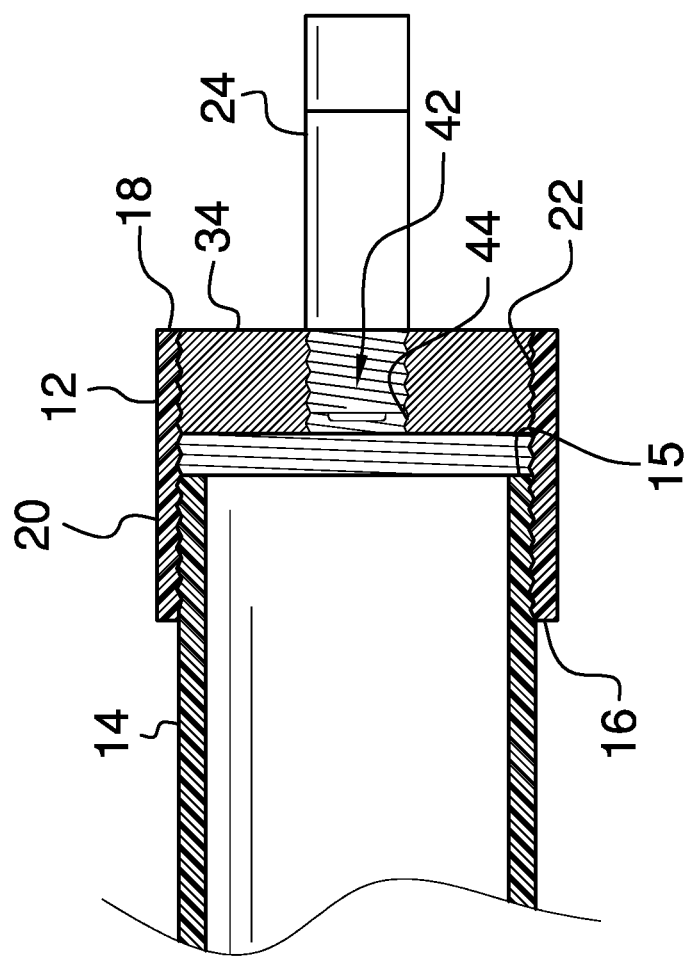
FIG. 6 is a cross sectional view taken along line 6-6 of FIG. 4 of an embodiment of the disclosure.

With reference now to the drawings, and in particular to FIGS. 1 through 6 thereof, a new alignment device embodying the principles and concepts of an embodiment of the disclosure and generally designated by the reference numeral 10 will be described.

As best illustrated in FIGS. 1 through 6, the conduit laser alignment assembly 10 generally comprises a plurality of tubes 12 that each has a unique diameter with respect to each other. Each of the tubes 12 may have a length ranging between approximately 3.0 inches and 5.0 inches. Additionally, the plurality of tubes 12 may have diameters ranging between approximately 0.75 inches and 2.5 inches. In this way the plurality of tubes 12 can fit around common sizes of conduits employed in building construction, including electrical conduits and plumbing conduits. Additionally, a respective one of the tubes 12 is positionable on an exposed end 15 of an existing conduit 14 in a building that has a diameter corresponding to the diameter of the respective tube 12.

Each of the tubes 12 has a first end 16, a second end 18 and an outer wall 20 extending therebetween. The outer wall 20 of each of the tubes 12 has an inside surface 22 and the inside surface 22 of the outer wall 20 of each of the tubes 12 is threaded. The first end 16 of the respective tube 12 insertably receives the exposed end 15 of the conduit 14. The respective tube 12 is chosen based on the diameter of the conduit 14 on which the respective tube 12 is to be mounted.

A laser emitter 24 is provided and the laser emitter 24 is removably coupled to the respective tube 12 when the respective tube 12 is positioned on the exposed end 15 of the conduit 14. In this way the laser emitter 24 emits a beam of light that extends along a longitudinal axis of the existing conduit 14 thereby facilitating the route of a new conduit to be displayed. The beam of light facilitates an installer to determine if the new conduit will encounter an obstruction along the route. In this way the installer can chose a different route or the installer can may the necessary modifications to route the new conduit around the obstruction.

The laser emitter 24 has a diameter that corresponds to the diameter of a respective one of the tubes 12. The laser emitter 24 has a primary end 26, a secondary end 28 and an outer surface 30 extending therebetween. The laser emitter 24 is elongated between the primary end 26 and the secondary end 28, and the outer surface 30 is threaded adjacent to the primary end 26. The secondary end 28 has a light emitter 32 positioned thereon for emitting the beam of light. The light emitter 32 may comprise a class III laser diode with an output ranging between 1.0 mW and 5.0 mW. The outer surface 30 of the laser emitter 24 threadably engages the inside surface 22 of the respective tube 12 that has the diameter which corresponds to the diameter of the laser emitter 24 when the respective tube 12 is positioned on the exposed end 15 of the existing conduit 14. In this way the laser emitter 24 can be coupled to the existing conduit 14 having the laser emitter 24 extending along a longitudinal axis of the existing conduit 14. The laser emitter 24 may have a diameter of approximately 0.75 inches.

A plurality of adapter disks 34 is provided and a respective one of the adapter disks 34 is positionable in a respective one of the tubes 12 that has a diameter which is greater than the diameter of the laser emitter 24. The laser emitter 24 is removably coupled to the respective adapter disk 34 when the respective adapter disk 34 is positioned on the respective tube 12. In this way the laser emitter 24 can be coupled to a tube 12 that has a greater diameter than the laser emitter 24.

Each of the adapter disks 34 has a first surface 36, a second surface 38 and a perimeter surface 40 extending therebetween, and the perimeter surface 40 of each adapter disk 34 is threaded. Each of the adapter disks 34 has an aperture 42 extending through the first surface 36 and the second surface 38. The aperture 42 is centrally positioned on the adapter disks 34. The aperture 42 has a bounding surface 44 and the bounding surface 44 is threaded. The perimeter surface 40 of the respective adapter disk 34 threadably engages the inside surface 22 of the respective tube 12 that has the greater diameter than the laser emitter 24. The outer surface 30 of the laser emitter 24 threadably engages the bounding surface 44 of the aperture 42 to retain the laser emitter 24 on the respective adapter disk 34.

In use, the respective tube 12 is positioned on the existing conduit 14 and the laser emitter 24 is threaded into the second end 18 of the respective tube 12. In this way the laser emitter 24 can emit the beam of light to indicate the route of new conduit to be installed on the existing conduit 14. Thus, the installer can make decisions for routing the new conduit to avoid obstructions and other problems that might be encountered when installing new conduit. The appropriate adapter disk 34 is chosen to couple the laser emitter 24 to a tube 12 that has a greater diameter than the laser emitter 24.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A conduit laser alignment assembly being configured to emit a laser beam from an existing conduit for displaying a potential route of newly installed conduit, said assembly comprising:

a plurality of tubes, each of said tubes having a unique diameter with respect to each other, a respective one of said tubes being positionable on an exposed end of an existing conduit in a building that has a diameter corresponding to the diameter of said respective tube;

a laser emitter being removably coupled to said respective tube when said respective tube is positioned on the exposed end of the conduit wherein said laser emitter is configured to emit a beam of light that extends along a longitudinal axis of the existing conduit thereby facilitating the route of a new conduit to be displayed, said laser emitter having a diameter that corresponds to the diameter of a respective one of said tubes; and an adapter disk being positionable in a respective one of said tubes that has a diameter being greater than the diameter of said laser emitter, said laser emitter being removably coupled to said adapter disk when said adapter disk is positioned on said respective tube for coupling said laser emitter to a tube that has a greater diameter than said laser emitter.

2. The assembly according to claim 1, wherein each of said tubes has a first end, a second end and an outer wall extending therebetween, said outer wall of each of said tubes having an inside surface, said inside surface of said outer wall of each of said tubes being threaded, said first end of said respective tube insertably receiving the exposed end of the conduit.

3. The assembly according to claim 2, wherein said laser emitter has a primary end, a secondary end and an outer surface extending therebetween, said laser emitter being elongated between said primary end and said secondary end, said outer surface being threaded adjacent to said primary end, said secondary end having a light emitter being positioned thereon for emitting the beam of light.

4. The assembly according to claim 3, wherein said outer surface threadably engages said inside surface of said respective tube that has the diameter which corresponds to the diameter of said laser emitter when said respective tube is positioned on the exposed end of the existing conduit.

5. The assembly according to claim 3, wherein said adapter disk has a first surface, a second surface and a perimeter surface extending therebetween, said perimeter surface being threaded, said adapter disk having an aperture extending through said first surface and said second surface, said aperture being centrally positioned on said adapter disk, said aperture having a bounding surface, said bounding surface being threaded.

6. The assembly according to claim 5, wherein said perimeter surface threadably engages said inside surface of said respective tube that has the greater diameter than said laser emitter, said outer surface of said laser emitter threadably engaging said bounding surface of said aperture to retain said laser emitter on said adapter disk.

7. A conduit laser alignment assembly being configured to emit a laser beam from an existing conduit for displaying a potential route of newly installed conduit, said assembly comprising:
- a plurality of tubes, each of said tubes having a unique diameter with respect to each other, a respective one of said tubes being positionable on an exposed end of an existing conduit in a building that has a diameter corresponding to the diameter of said respective tube, each of said tubes having a first end, a second end and an outer wall extending therebetween, said outer wall of each of said tubes having an inside surface, said inside surface of said outer wall of each of said tubes being threaded, said first end of said respective tube insertably receiving the exposed end of the conduit;
- a laser emitter being removably coupled to said respective tube when said respective tube is positioned on the exposed end of the conduit wherein said laser emitter is configured to emit a beam of light that extends along a longitudinal axis of the existing conduit thereby facilitating the route of a new conduit to be displayed, said laser emitter having a diameter that corresponds to the diameter of a respective one of said tubes, said laser emitter having a primary end, a secondary end and an outer surface extending therebetween, said laser emitter being elongated between said primary end and said secondary end, said outer surface being threaded adjacent to said primary end, said secondary end having a light emitter being positioned thereon for emitting the beam of light, said outer surface threadably engaging said inside surface of said respective tube that has the diameter which corresponds to the diameter of said laser emitter when said respective tube is positioned on the exposed end of the existing conduit; and
- an adapter disk being positionable in a respective one of said tubes that has a diameter being greater than the diameter of said laser emitter, said laser emitter being removably coupled to said adapter disk when said adapter disk is positioned on said respective tube for coupling said laser emitter to a tube that has a greater diameter than said laser emitter, said adapter disk having a first surface, a second surface and a perimeter surface extending therebetween, said perimeter surface being threaded, said adapter disk having an aperture extending through said first surface and said second surface, said aperture being centrally positioned on said adapter disk, said aperture having a bounding surface, said bounding surface being threaded, said perimeter surface threadably engaging said inside surface of said respective tube that has the greater diameter than said laser emitter, said outer surface of said laser emitter threadably engaging said bounding surface of said aperture to retain said laser emitter on said adapter disk.

\* \* \* \* \*